(12) United States Patent
Simmons et al.

(10) Patent No.: US 6,708,198 B1
(45) Date of Patent: Mar. 16, 2004

(54) EFFICIENTLY INITIATING LOCK STATE TRANSITIONS FOR DISTRIBUTED RESOURCE OBJECTS THAT PARTICIPATE IN A DISTRIBUTED LOCK MANAGEMENT SYSTEM

(75) Inventors: Charles Simmons, San Mateo, CA (US); Madhusudan Krishnapuram, Mountain View, CA (US); Hans Karten, Ermelo (NL)

(73) Assignee: Oracle International Corporation, Redwood Shores, CA (US)

( * ) Notice: Subject to any disclaimer, the term of this patent is extended or adjusted under 35 U.S.C. 154(b) by 187 days.

(21) Appl. No.: 09/798,610

(22) Filed: Mar. 1, 2001

Related U.S. Application Data

(62) Division of application No. 08/669,689, filed on Jun. 24, 1996, now Pat. No. 6,574,654.

(51) Int. Cl.[7] .................................................. G06F 9/00
(52) U.S. Cl. ............................ 709/104; 709/229; 707/8
(58) Field of Search ................................ 709/104, 226, 709/229; 707/8–10

(56) References Cited

U.S. PATENT DOCUMENTS

| | | | | |
|---|---|---|---|---|
| 4,965,719 A | * | 10/1990 | Shoens et al. ............... 711/100 |
| 5,161,227 A | * | 11/1992 | Dias et al. ................... 709/104 |
| 5,202,971 A | * | 4/1993 | Henson et al. ............... 710/200 |
| 5,339,427 A | * | 8/1994 | Elko et al. ................... 709/103 |
| 5,408,653 A | * | 4/1995 | Josten et al. ..................... 707/8 |
| 5,454,108 A | * | 9/1995 | Devarakonda et al. ....... 709/104 |
| 5,459,871 A | * | 10/1995 | Van Den Berg ............. 709/104 |
| 5,490,270 A | * | 2/1996 | Devarakonda et al. ......... 707/8 |
| 5,551,046 A | * | 8/1996 | Mohan et al. ................... 707/8 |
| 5,596,754 A | * | 1/1997 | Lomet ......................... 710/200 |
| 5,682,537 A | * | 10/1997 | Davies et al. ................ 710/200 |
| 5,734,909 A | * | 3/1998 | Bennett ....................... 710/200 |
| 5,832,484 A | * | 11/1998 | Sankaran et al. ............... 707/8 |
| 5,835,766 A | * | 11/1998 | Iba et al. ..................... 709/104 |
| 5,940,828 A | * | 8/1999 | Anaya et al. .................... 707/8 |

* cited by examiner

Primary Examiner—John Follansbee
Assistant Examiner—Lewis A. Bullock, Jr.
(74) Attorney, Agent, or Firm—Marcel K. Bingham; Hickman Palermo Truong & Becker LLP

(57) ABSTRACT

A system for managing locks that give permission to access resources in a computer system is disclosed. The lock management system is distributed and provides deadlock protection. The lock management system is distributed in that information about which locks have been granted for a resource is stored at both a master node and at the nodes on which are located processes that desire to access to the resource. A master resource object located on the master node grants locks to shadow resource objects located on the nodes on which are located the processes that desire to access the resource. Each shadow resource object grants locks on the resource to the processes that are located on the same node as the shadow resource object. The master resource object includes a convert queue used to maintain a list of convert requests made by various processes. The lock request for shadow resource objects are granted when the lock request is at the head of the convert queue. When granting the second lock request, other lock requests in the queue from shadow resource objects are granted if they are compatible with the locks granted by the master resource object.

18 Claims, 12 Drawing Sheets

EFFICIENTLY INITIATING LOCK STATE TRANSITIONS FOR DISTRIBUTED RESOURCE OBJECTS THAT PARTICIPATE IN A DISTRIBUTED LOCK MANAGEMENT SYSTEM

RELATED APPLICATION

This application is a divisional application of and claims priority from prior U.S. patent application Ser. No. 08/669,689 entitled "Method and Apparatus for Lock Caching", filed Dec. 04, 2000, which is a Continued Prosecution Application of U.S. patent application Ser. No. 08/669,689, also filed by Charles Simmons, et al. but having a filing date of Dec. 28, 1998, which is a Continued Prosecution Application of U.S. patent application Ser. No. 08/669,689 entitled "Method and Apparatus for Lock Caching", also filed by Charles Simmons, et al. but having a filing date of Jun. 24, 1996 now U.S. Pat. No. 6,574,654 the entire disclosures of which are hereby by incorporated by reference as if fully set forth herein now U.S. Pat. No. 6,574,654.

FIELD OF THE INVENTION

The present invention relates to a method and apparatus for lock caching, and more specifically, to a method and apparatus for using distributed resource objects to manage locks to control access to resources.

BACKGROUND OF THE INVENTION

Computers use resources, such as memory, modems and printers, during the execution of computer programs. Many of these resources are only used periodically by any given computer program. For example, the amount of time a word processing application requires a printer to print documents is typically small relative to the amount of time that the word processing application is used to create documents. If the only process that had access to the printer was a single word processing application, the printer would remain idle most of the time.

To take full advantage of resources, computer networks have been developed in which processes running on many computer devices or "nodes" can share resources. Thus, instead of having to purchase one printer for every computer, users may purchase a single printer that may be connected to a network that has many computers. Processes on each computer on the network access the printer only when the processes require the printer.

Even though resources may be shared, as described above, many resources may not be used by more than one process at any given time. For example, most printers are unable to print more than one document at a time. Other resources, such as data blocks of a storage medium or tables stored on a storage medium, may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to the resource. There are many types of locks. Some types of locks may be shared by many processes, while other types of locks prevent any other locks to be granted on the same resource. FIG. 1a illustrates a hierarchy of lock modes that may be used to govern access to a table in a database.

At the lowest level in the hierarchy is a NULL mode lock 160. Ownership of a NULL mode lock on a table grants a process no permission to access the table in any manner. Ownership of a concurrent read lock 158 grants a process permission to read the table, but does not guarantee that other processes are not concurrently writing to the table. Ownership of a protected read lock 154 grants a process permission to read the table and guarantees that no other process is concurrently writing to the table. Ownership of a concurrent write lock. 156 grants a process permission to write to the table, but does not guarantee that another process is not also writing to the table. Ownership of a protected write lock 152 grants a process permission to write to the table and guarantees that another process is not also writing to the table. Ownership of an exclusive mode lock 150 grants a process permission to do anything with a table, and guarantees that no other process is performing any operation on the table.

Due to the various permissions and guarantees associated with these locks, certain lock combinations are not allowed. For example, if a process owns an exclusive mode lock on a resource, then no other process can be granted any lock other than a NULL mode lock. If a process owns a protected write lock, then no other process may be granted an exclusive mode lock, a protected write lock, a protected read lock or a concurrent write lock. If a process owns a protected read lock, then no other process may be granted an exclusive mode lock, a protected write lock or a concurrent write lock. If a process owns a concurrent write lock, then no other process may be granted an exclusive mode lock, a protected write lock, or a protected read lock. If a process owns a concurrent read lock, then no other process may be granted an exclusive mode lock.

A category of lock that may be held by more than one process at a time is referred to as a shared lock. For example, two processes can hold concurrent read locks on the same resource at the same time, so concurrent read locks are shared locks. For the purposes of explanation, the following description shall refer to exclusive mode locks, shared mode locks, and NULL mode locks.

Before a process can perform an operation on a resource, the process is required to obtain a lock that grants to the process the right to perform the desired operation on the resource. To obtain a lock, a process transmits a request for the lock to a lock manager. A lock manager is a process that is responsible for granting, queuing, and keeping track of locks on one or more resources. To manage the use of resources in a network system, lock managers are executed on one or more nodes in the network.

According to one prior art implementation, a lock manager implements two types of objects: a resource object and a lock. Resource objects are data structures that correspond to actual resources. An application that uses a lock manager establishes a mapping between actual resources and resource objects. Each resource object has two queues: a granted queue and a convert queue. The granted queue is an unordered list of locks that have been granted. The convert queue is a partially ordered list of locks that have been requested, but not yet granted. Typically, a request for a lock is actually a convert request, where a process holding a lock is requesting that the lock it holds be converted from one mode of lock to a different mode of lock.

Locks are data structures that identify a process and a lock mode. Lock managers attach locks to the grant queues of resource objects to indicate that the process identified in the lock has been granted a lock of the type indicated in the lock on the resource that corresponds to the resource object to which the lock is attached.

FIG. 1b is a block diagram illustrating a typical lock manager 106. Lock manager 106 is a process that is configured to manage a resource object 100 stored in a memory 108. The resource object includes a granted queue 102 and a convert queue 104. Lock manager 106 has attached three locks 110, 112 and 114 to the granted queue 102, and one convert request 130 to the convert queue 104.

All locks and convert requests have a process ID portion and a lock mode portion. The process ID portion 116 of lock 110 indicates that a process PROC_1 owns lock 110, and the lock mode portion 118 of lock 110 indicates that lock 110 is an exclusive lock. The process ID portion 120 of lock 112 indicates that lock 112 is owned by a process PROC_2, and the lock mode portion 122 of lock 112 indicates that lock 112 is a NULL mode lock. The process ID portion 124 of lock 114 indicates that lock 114 is owned by a process PROC_3, and the lock mode portion 126 of lock 114 indicates that lock 114 is a NULL lock. The process ID portion 132 of convert request 130 indicates that convert request 130 is associated with process PROC_4, and the lock mode portion 136 of convert request 130 indicates that PROC_4 currently holds a NULL mode lock on the resource. In addition to a lock mode portion 136, convert request 130 has a requested mode portion 134 that indicates that PROC_4 is requesting an exclusive mode lock.

Lock manager 106 has attached locks 110, 112 and 114 to granted queue 102, indicating that PROC_1 currently has exclusive ownership of the resource that corresponds to resource object 100. Lock manager 106 has attached convert request 130 to the convert queue 104, indicating that PROC_4 has requested but has not yet been granted an exclusive mode lock on the resource associated with resource object 100.

Information pertaining to any given resource may be stored in the resource object that corresponds to the resource. Each resource object is stored in the memory of a single node. The node on which a resource object is stored is referred to as the master node for the resource object.

According to one lock management approach, a process initially establishes a NULL mode lock on all resources that the process will possibly use. Then, when the process actually requires access to a resource, the process requests that its NULL mode lock be converted to a lock that grants to the process the rights to perform the desired operation.

For example, to delete a table, a process must obtain an exclusive mode lock on the resource object that corresponds to the table. To obtain the exclusive mode lock, the process transmits a message to the lock manager that controls the resource object that corresponds to the table. In the message, the process requests that its current NULL mode lock be converted to an exclusive mode lock. If no other process has requested a conversion, and if no currently granted locks would prevent the grant of an exclusive mode lock, then the current lock held by the requesting process is converted to an exclusive mode lock. Once the lock manager performs the requested conversion, the lock manager transmits a message to the requesting process to indicate that the requested conversion operation has been performed.

If a process requires access to read data from a table, the process must obtain a shared mode lock. To obtain a shared mode lock, the process requests the lock manager that controls the resource object that corresponds to the table to convert its current lock to a shared mode lock. If no other process has requested a conversion, and if no currently granted locks would prevent the grant of a shared mode lock, then the current lock held by the requesting process is converted to a shared mode lock.

If an exclusive mode lock has already been granted for the table, then a shared mode lock cannot be granted. Under these circumstances, the lock convert request is placed on the convert queue of the resource object. When the blocking process is ready to release its exclusive lock, the blocking process may send a lock downgrade request to the lock manager. The lock manager responds by converting the exclusive mode lock to a lesser lock that allows the grant of the shared mode lock. The shared mode lock is then granted by moving the shared mode lock request from the requested queue to the granted queue and transmitting a message to the requesting process to inform the requesting process that the shared mode lock has been granted.

The convert queue of a resource object is a partially ordered list that holds all outstanding (ungranted) lock requests. If any outstanding lock requests have not been granted, one of the ungranted lock requests will be at the "head" of the convert queue. Even if the currently granted locks do not prevent a lock manager from granting a particular lock request, the lock request is placed on the convert queue if the convert queue is not empty. This policy prevents "livelocks", where one process cannot make progress in the system while other processes can.

In networked computer systems, some or all of the processes that are holding and requesting locks on a particular resource may be on different nodes than the node that contains the resource object that corresponds to the resource. For example, the process desiring a lock and the lock resource may reside within different nodes of a multi-processor machine, or on different workstations in a local area network. Consequently, all of the messages that pass between the lock-requesting processes and the lock manager must be transmitted between nodes over the network. The computational power that must be expended to facilitate such inter-node messages is significant relative to the power required for intra-node communication. In addition, inter-node communication is generally slower than intra-node communication. Further, the inter-node traffic thus generated reduces the throughput available for other types of inter-node traffic, which may be significant when the inter-node traffic is between workstations on a network.

FIG. 2 illustrates a computer system in which four nodes 202, 206, 210 and 214 are connected through a network 216. Nodes 202, 206 and 210 are executing process 204 (PROC_1), process 208 (PROC_2) and process 212 (PROC_3), respectively. Lock manager 106 is resides on node 214. Every time one of processes 204, 208 and 212 wish to acquire, upgrade, downgrade or release a lock on a resource object controlled by lock manager 106, the processes must send messages to node 214 through network 216. Every time a convert request is granted on lock manager 106, a message must be sent from node 214 to the node on which resides the process that requested the lock conversion.

Based on the foregoing, it is clearly desirable to provide a mechanism for allocating locks between processes that requires less inter-node traffic. It is further desirable to increase the ratio of intra-node communication relative to inter-node communication to provide more efficient communication between processes.

SUMMARY OF THE INVENTION

A system for managing locks that give permission to access resources in a computer system is disclosed. The lock management system is distributed and provides deadlock protection. The lock management system is distributed in that information about which locks have been granted for a resource is stored at both a master node and at the nodes on which are located processes that desire to access to the resource. A master resource object located on the master node grants locks to shadow resource objects located on the nodes on which are located the processes that desire to access the resource. Each shadow resource object grants locks on the resource to the processes that are located on the same node as the shadow resource object.

According to an aspect of the present invention, the master resource object includes a convert queue used to maintain a list of convert requests made by various processes. The lock request for shadow resource objects are granted when the lock request is at the head of the convert queue. When granting the second lock request, other lock requests in the queue from shadow resource objects are granted if they are compatible with the locks granted by the master resource object.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6b illustrates a portion of the flow chart of FIG. 6a;

FIG. 6c illustrates a portion of the flow chart of FIG. 6a;

FIG. 6d illustrates a portion of the flow chart of FIG. 6a;

DETAILED DESCRIPTION OF THE PREFERRED EMBODIMENT

A method and apparatus for managing access to a resource using distributed resource objects are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

As shall be explained in greater detail hereafter, shadow resource objects are used to distribute over many nodes the information about which locks have been granted on a resource. Unlike the prior art which uses a centralized resource object to maintain a complete unordered list of locks which are currently granted on a resource, the present invention causes this list of locks which are currently granted to be distributed so that the shadow resource object at each node maintains its own unordered list of locks that were created at the node on which the shadow resource resides. Also unlike the prior art which also uses the centralized resource object to store a partially ordered list of requested (converting) locks, the present invention causes this list to be distributed so that the shadow resource object at each node maintains its own partially ordered list of lock conversions that have been requested by processes on the node.

The master resource object includes a convert queue used to maintain a partially ordered list of convert requests made by the shadow resource objects on the various other nodes. The convert queue on the master resource object is referred to as the "global convert queue". The convert request at the head of the global convert queue is referred to as the "global head request". As shall be explained in greater detail below, information about the global head request is propagated to the shadow resource objects in the system, and is one factor used by the shadow resource objects to determine whether lock convert requests can be granted.

ARCHITECTURE OVERVIEW

Figure 1A:
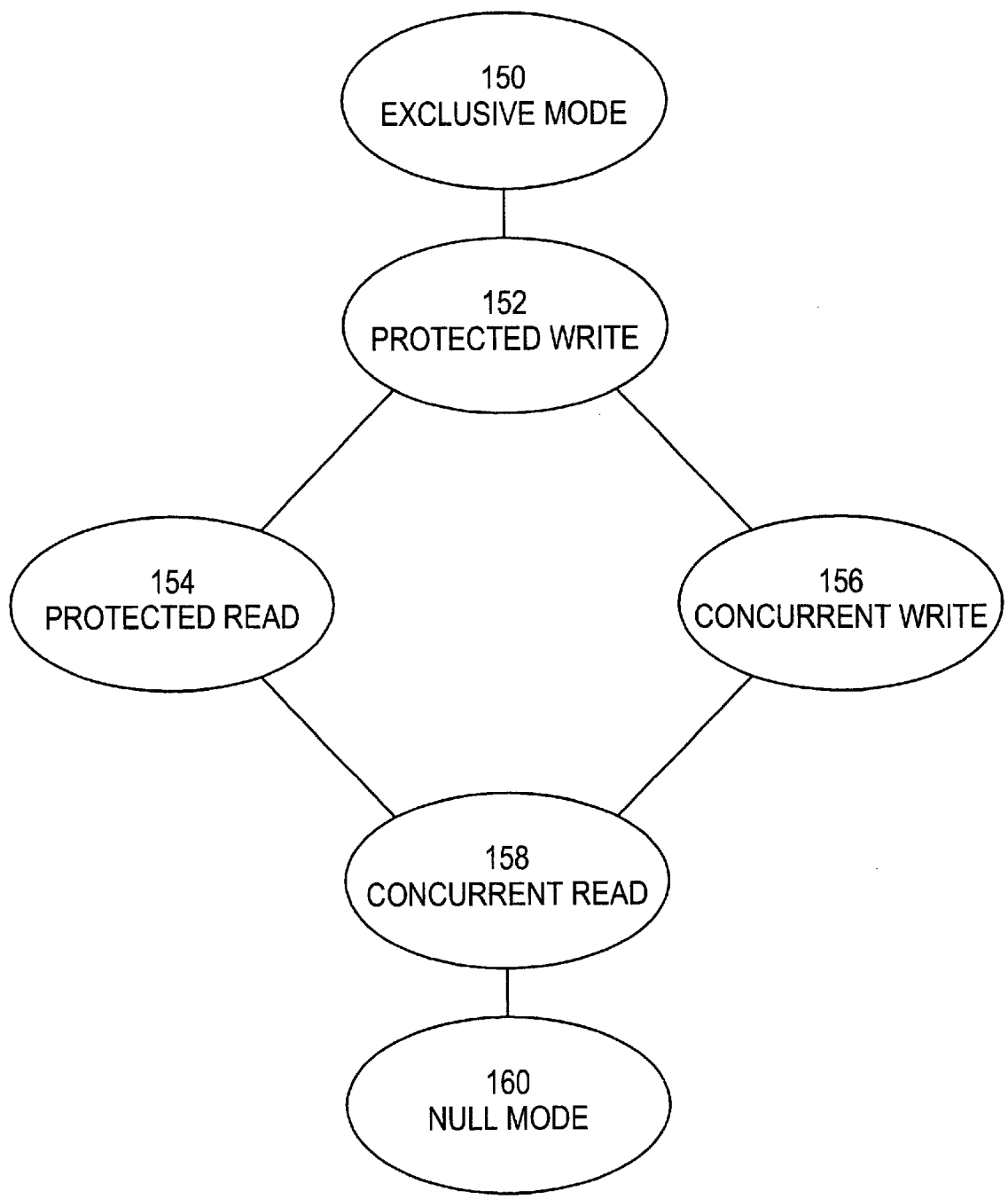
FIG. 1a is a diagram that illustrates the relationships between various types of resource locks.
Figure 1B:
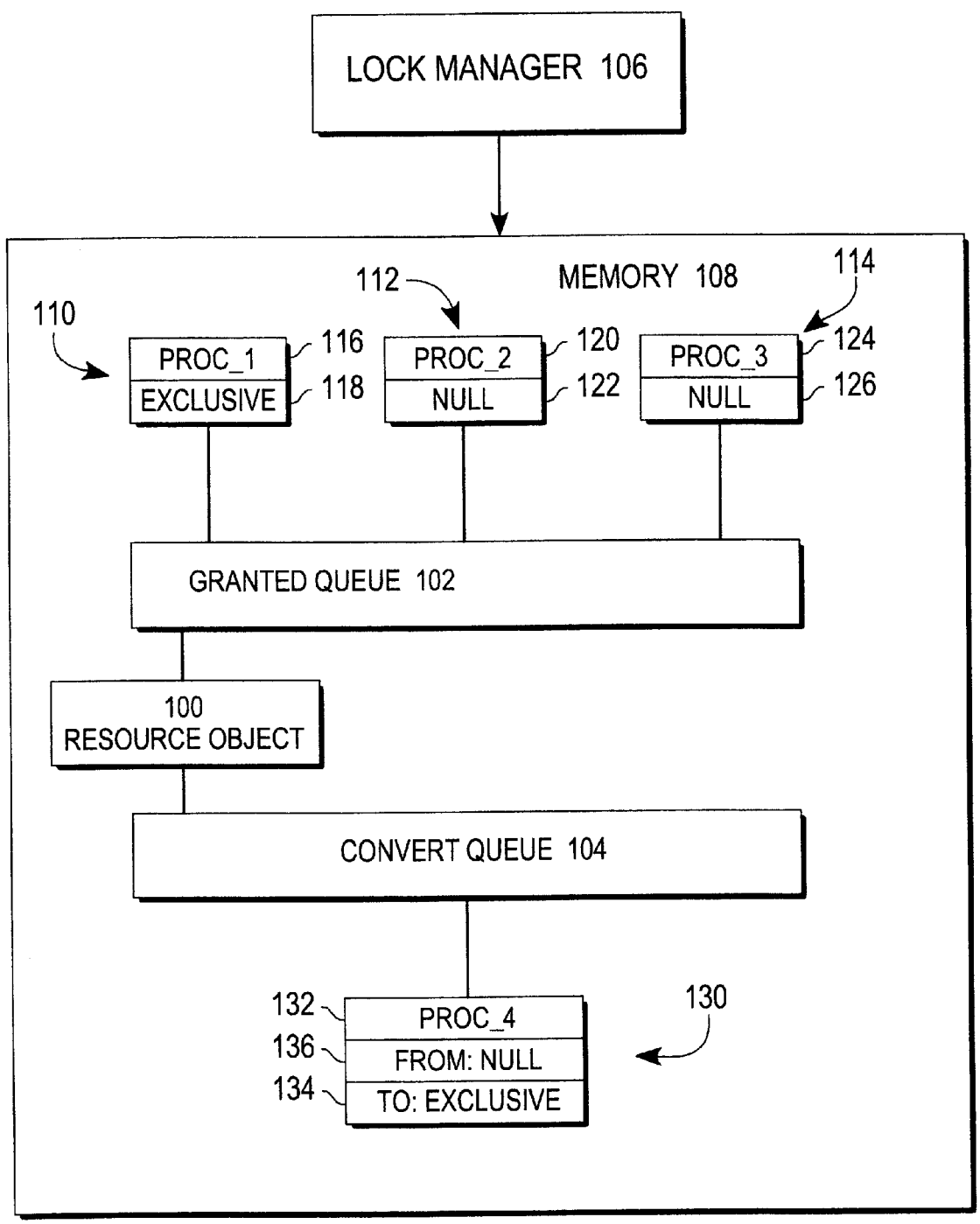
FIG. 1b is a block diagram of a centralized lock manager object according to the prior art.
Figure 2:
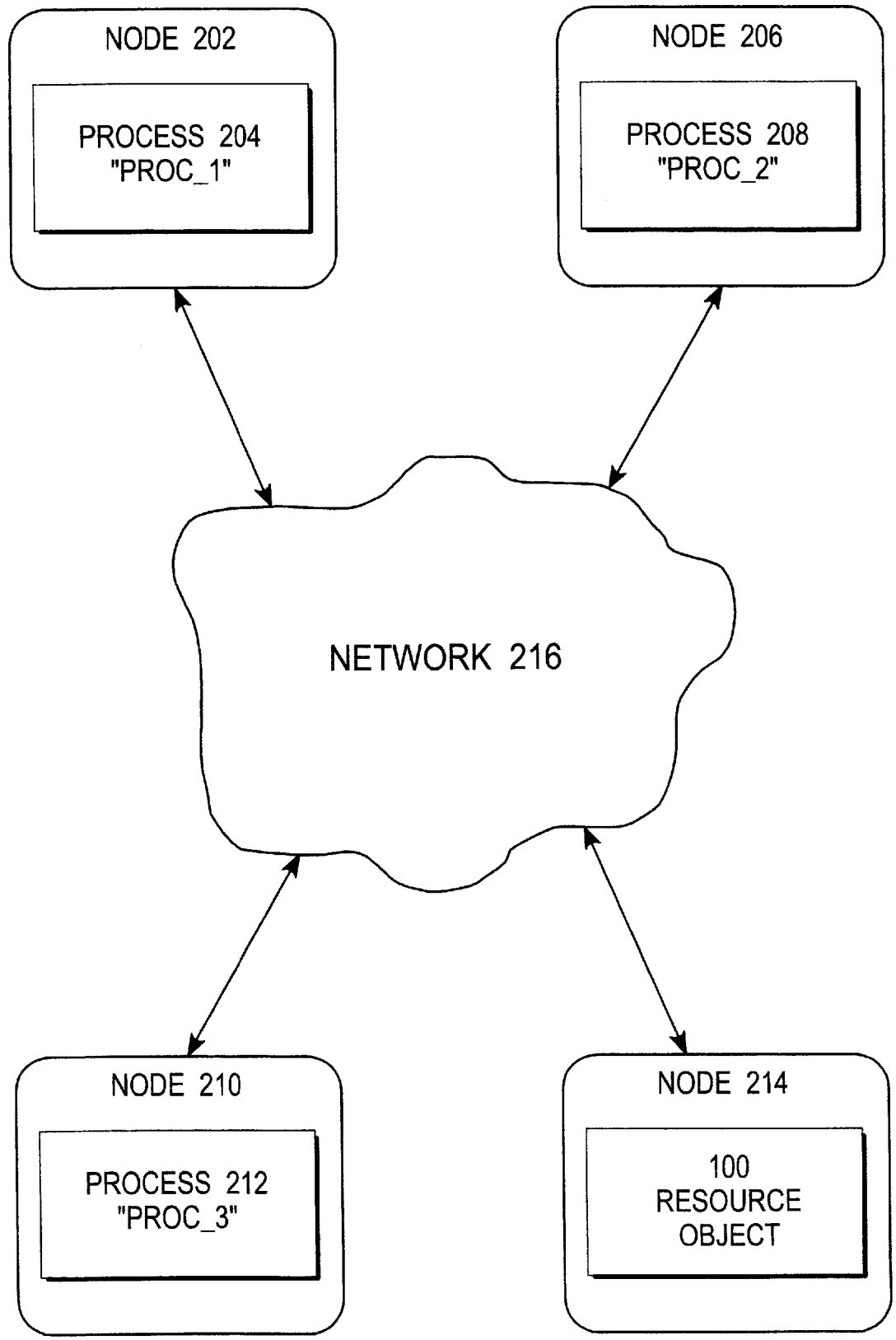
FIG. 2 is a block diagram that illustrates processes on three nodes attempting to obtain permission to use a resource by communicating over a network with a central resource object according to the prior art.
Figure 3:
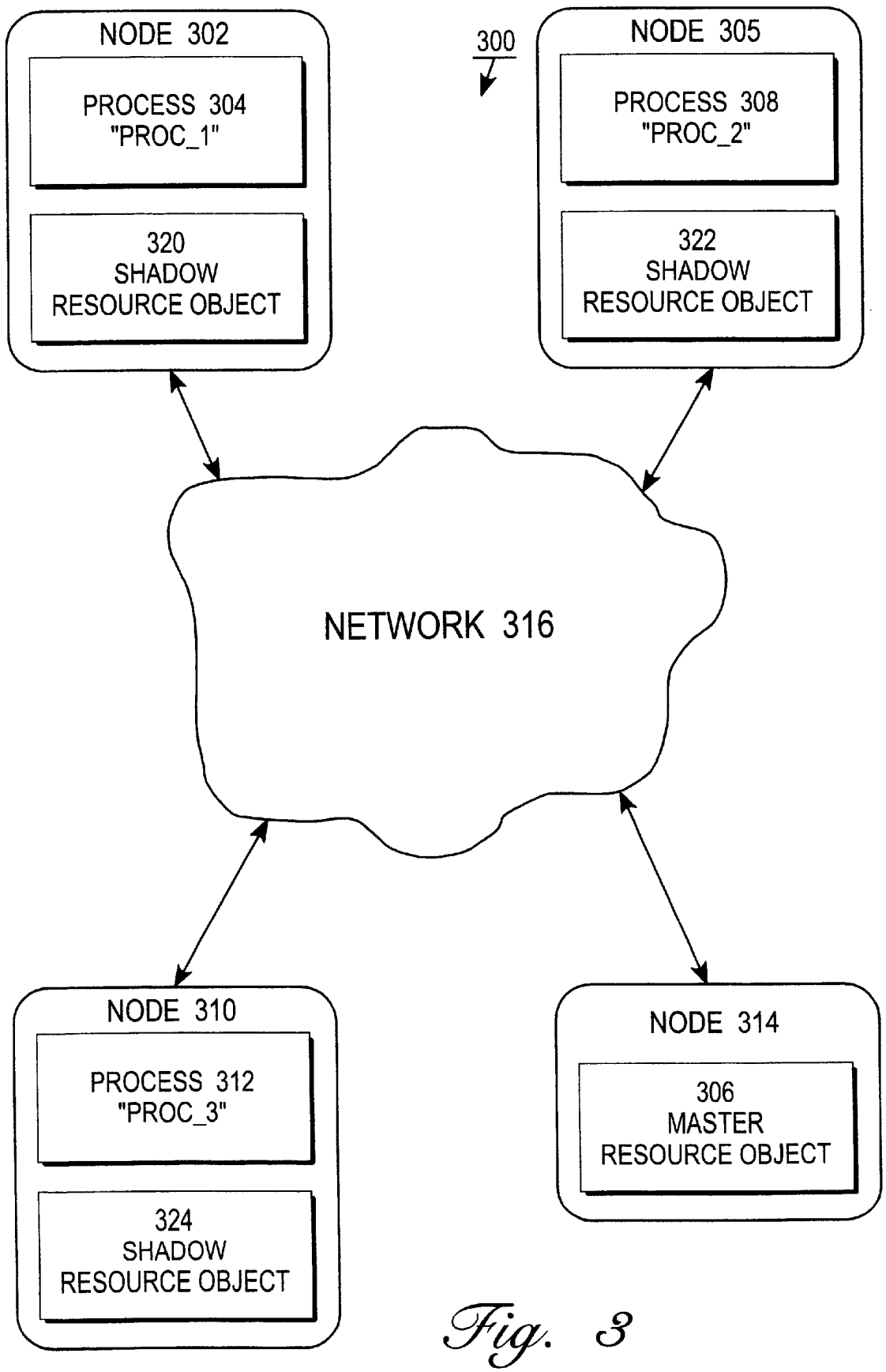
FIG. 3 is a block diagram that illustrates a distributed lock management system according to an embodiment of the invention.

Referring to FIG. 3, it illustrates a lock management system 300 that uses distributed resource objects according to an embodiment of the invention. For the purposes of explanation it shall be assumed that system 300 is being used to manage access to a table "TABLE_1" in a database. In system 300, locks for TABLE_1 are managed using a master resource object 306 and a plurality of shadow resource objects 320, 322 and 324. The plurality of shadow resource objects 320, 322 and 324 are distributed among the nodes 302, 305 and 310 that have processes that have requested locks on TABLE_1.

The resource objects that are discussed herein may be implemented within various types of entities, including processes, threads, or the kernel of an operating system. In the following discussion, a resource object shall be said to perform an action if the entity which implements the resource object performs the action.

The distributed lock management system 300 has two tiers of locks. At the first tier, the master resource object 306 for TABLE_1 has attached thereto locks that are owned by the various shadow resource objects. At the second tier, each shadow resource object for TABLE_1 has attached thereto locks that are owned by the processes that (1) have requested locks on TABLE_1 and (2) are located in the same node as the shadow resource object.

Each shadow resource object also maintains mode held data, global convert mode data, and master knowledge data. Mode held data indicates the lock mode held by the shadow resource object at the master resource object. Global convert mode data indicates the mode requested by the current global head request. Master knowledge data indicates the information that the shadow resource object has most recently sent to the master resource object about the shadow resource object. The contents and use of this data shall be described in greater detail below.

OPERATION OVERVIEW

When a process desires to perform an operation on TABLE_1 that is not permitted by the lock currently held by the process, the process does not transmit a lock upgrade request to master resource object 306 over network 316. Rather, the process transmits a lock upgrade request to the shadow resource object that is stored on the same node as the process. The shadow resource object for TABLE_1 grants or queues the lock request based on the locks attached to its grant queue, the mode requested by the convert request at the head of its local convert queue (the "local head request") and the mode requested by the global head request, without communicating with the master resource object unless the lock requested by the process is more restrictive than the lock on TABLE_1 currently held by the shadow resource object.

Because the present invention allows processes to request lock operations by interacting with local shadow resource objects, and because this interaction takes place within a single a node, it is performed more efficiently than the inter-node interaction required by prior art lock management mechanisms. Except when the shadow resource objects need to change the type of lock that they hold on a resource, lock operations performed for the processes do not generate inter-node traffic. In many circumstances, the number of lock requests issued by shadow resource objects will be small relative to the number of process-issued lock requests. Consequently, the amount of inter-node traffic generated by the distributed lock manager system 300 may be substantially lower than prior art lock management systems.

In addition, the system concurrency is increased. For example, in prior art systems that use centralized resource objects, if processes were converting between NULL and shared modes, all convert requests have to be sent to a central location, thus limiting the number of converts per second to the number of converts that can be executed at the single central node. With lock caching, the number of converts per second can be increased up to the number that may be performed using the computing power of all of the nodes in the system. The operation of the various components of system 300 shall be described in greater detail below.

OPERATION OF A MASTER RESOURCE OBJECT

Figure 4:
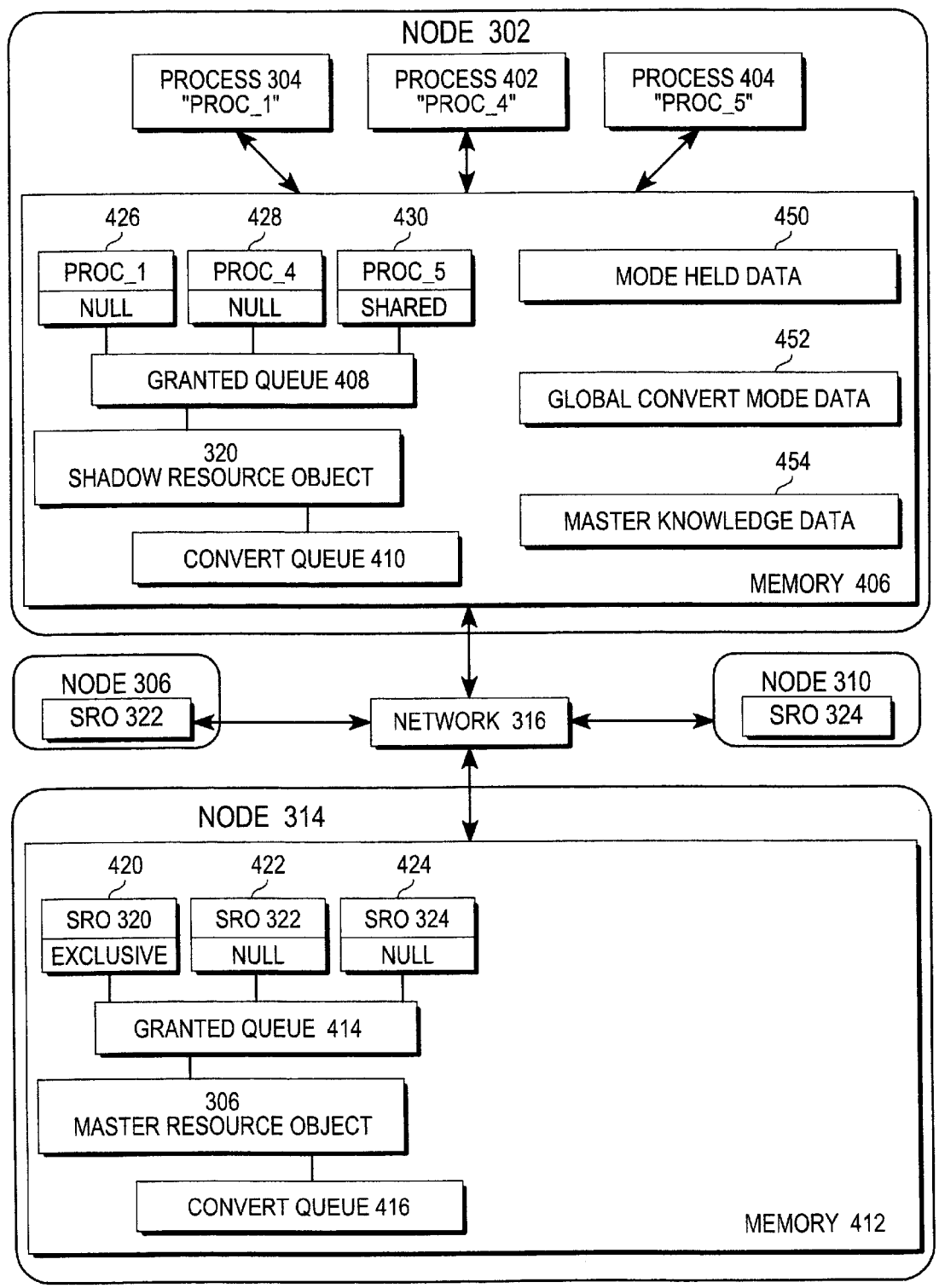
FIG. 4 is a block diagram that illustrates various components of the distributed lock management system of FIG. 3 in greater detail.

Referring to FIG. 4, it illustrates nodes 302 and 314 of FIG. 3 in greater detail. Node 314 includes master resource object 306 and is coupled to network 316 so that master resource object 306 is able to receive messages over network 316. Master resource object 306 corresponds to an actual resource, such as a printer, modem, or data block. For the purposes of explanation, it shall again be assumed that the managed resource is a table "TABLE_1" of a database.

Master resource object 306 has a granted queue 414 to which are attached locks on TABLE_1 that have been granted to shadow resource objects by master resource object 306, and a convert queue 416 to which are attached locks on TABLE_1 that have been requested by shadow resource objects but have not yet been granted. As explained above, master resource object 306 receives lock operation requests from shadow resource objects, not from the processes that actually will use TABLE_1. Therefore, the locks 420, 422 and 424 attached to the queues of master resource object 306 do not have a process ID portion. Rather, they have a shadow resource object ID portion that identifies the shadow resource object that owns the lock. It should be noted, however, that to the extent that a master resource object is also serving as a shadow resource object to processes executing on the same node as the master resource object, the locks on the resource object may include locks associated with processes that use the resource.

In the illustrated example, lock 420 is an exclusive mode lock that has been granted to shadow resource object 320, lock 322 is a NULL mode lock that has been granted to shadow resource object 322, and lock 424 is a NULL mode lock that has been granted to shadow resource object 324.

Figure 5:
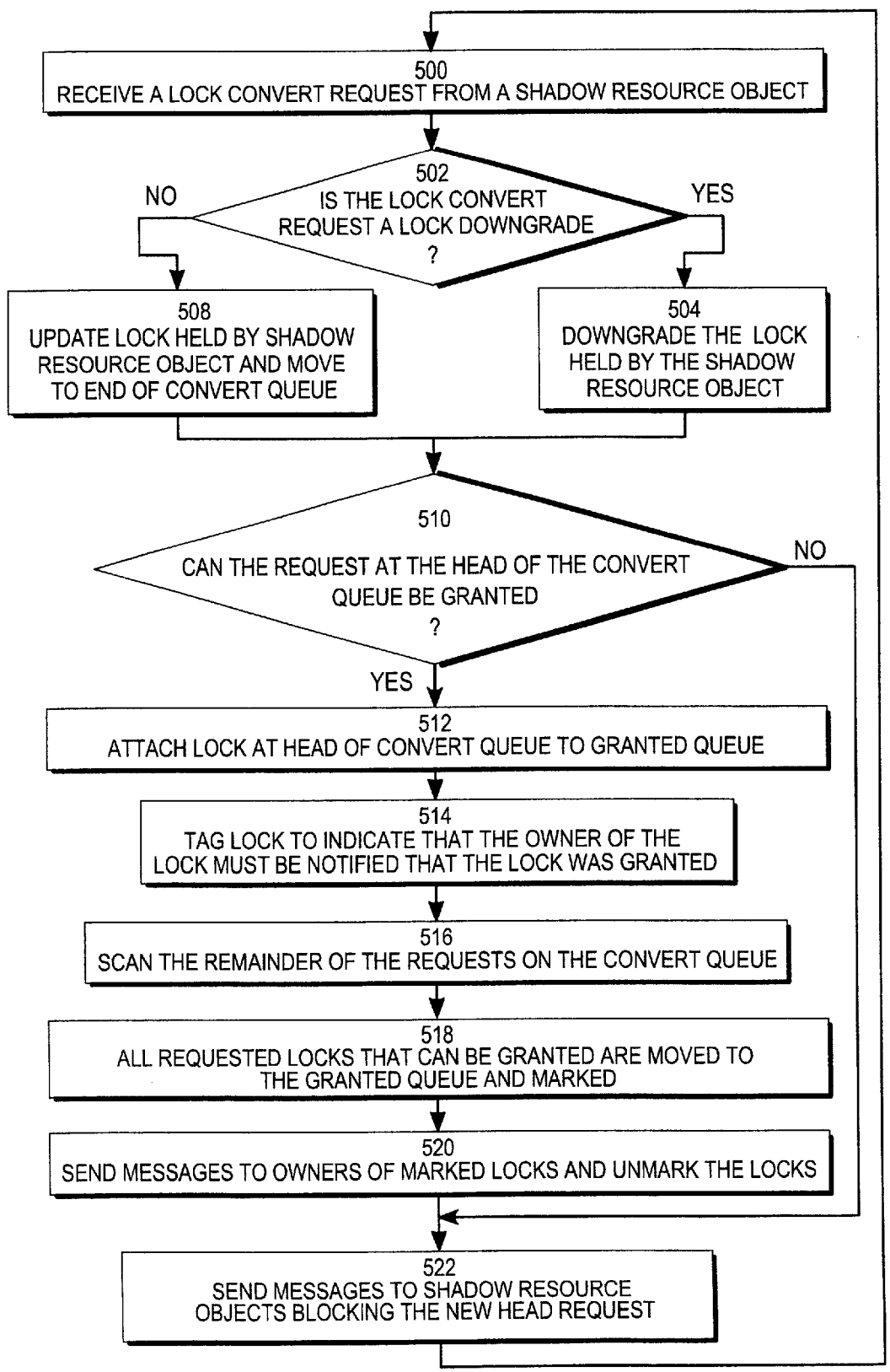
FIG. 5 is a flow chart illustrating steps performed by a master resource object upon receiving a lock convert request from a shadow resource object.

FIG. 5 is a flow chart illustrating the steps performed by master resource object 306 upon the receipt of a lock convert request from a shadow resource object. For the purposes of explanation, it shall be assumed that master resource object 306 receives a request from shadow resource object 322 for lock 422 to be upgraded to a shared mode lock (step 500). The upgrade request indicates the type of lock the shadow resource object is holding and the type of lock the shadow resource object desires.

At step 502, the master resource object 306 compares the type of lock that the shadow resource object currently holds to the type of lock that the shadow resource object desires to determine whether the requested operation is a downgrade. If the requested operation is a downgrade, then control passes to step 504. Otherwise, control passes to step 508.

At step 504, the master resource object 306 downgrades the lock held by the shadow resource object. The downgrade operation is performed by locating the lock on the granted locks queue 414 that belongs to the shadow resource object and updating the lock mode information stored in the lock to indicate the new mode associated with the lock.

At step 508, the lock held by the shadow resource object is updated to the desired mode and moved to the end of the global convert queue 416. In the present example, lock 422 is moved from granted queue 414 to the end of convert queue 416 and updated from a NULL mode lock to a shared mode lock. It should be noted that a subsequent convert request may override a previous convert request. For example, if shadow resource object 322 had previously requested an upgrade to an exclusive mode lock, step 508 would involve updating the exclusive mode lock request for shadow resource object 322 on convert queue 416 to request a shared mode lock.

At step 510 the master resource object 306 determines whether the lock request at the head of the global convert queue 416 can now be granted. If the lock request at the head of the global convert queue 416 cannot be granted, then control passes back to step 500 where the master resource object waits for the next lock convert request. In the present example, the only request on the global convert queue 416 is the request to upgrade lock 422 to a shared mode lock. This request cannot be currently granted because exclusive mode lock 420 has been granted. Therefore, control would pass back to step 500.

If the request at the head of the global convert queue 416 can be granted, then control passes to step 512. At step 512, the master resource object 306 grants the request at the head of the global convert queue 416 by attaching the lock request to the granted queue 414. The master resource object 306 also marks the lock to indicate that a message is to be sent to the owner of the lock to inform the owner that the lock has been granted (step 514).

At step 516, the remainder of the requests on the global convert queue 416 are scanned. All outstanding requests that can be granted are granted. As described above, the granting process involves moving the locks from the global convert queue 416 to the granted queue 414 and marking the locks to indicate that messages must be sent to the owners of the locks (step 518).

The technique of granting all requested locks that can be granted when the head lock request is granted can significantly improve the performance of the system. For example, assume that 100 processes have requested lock conversions, where 50 have requested exclusive locks and 50 have requested shared locks. Assume also that the lock requests arrived in a sequence such that the shared and exclusive requests alternate on the global convert queue 416. Assume also that a shared lock at the head of the convert queue is granted.

A system that does not grant all possible requests would simply wait until the next request on the convert queue (a request for an exclusive lock) can be granted. When the exclusive lock request can be granted, the system would wait until the next request (a shared mode request) could be granted. This process would be repeated until the last of the 100 requests was granted. The total time to process the 100 locks would therefore by 50A+50B, where A equals the average time to perform an exclusive mode operation and B equals the average time to perform a shared mode operation.

In a system that does grant all possible requests when the head lock request is granted, the system would grant all of the shared mode lock requests when the first shared mode lock request is granted. All 50 processes holding the shared mode locks may then run concurrently. After all of the processes have completed the shared mode operations, the exclusive mode locks can be granted sequentially in the order in which they arrived. The total time for granting all of the 100 requests in this case would be 50A+C, where A equals the average time to perform an exclusive mode operation and C is the time to perform the longest of the shared mode operations.

At step 520, messages are sent to the owners of the locks that were marked during steps 514 and 518. The messages indicate to the owners of the locks the type of lock that they have been granted, as well as the requested mode of the lock that is now at the head of the global convert queue 416.

At step 522, messages are sent to any shadow resource objects that (1) own locks that are blocking the request at the head of convert queue 416 and (2) have not already been implicitly informed that they are blocking head request on the convert queue. These messages indicate the mode requested by the head request on the convert queue. Control then proceeds to step 500.

OPERATION OF SHADOW RESOURCE OBJECTS

Shadow resource objects operate similar to master resource objects with the exceptions that (1) shadow resource object holds its own lock on the resources that it manages, and (2) a shadow resource object is not able to grant to a process a lock that is more restrictive than the lock held by the shadow resource object itself. In addition, shadow resource objects see only their own portion of the global convert queue, and store mode held data, global convert mode data, and master knowledge data.

FIGS. 6*a*–6*d* are flow charts illustrating the operation of a shadow resource object upon receipt of a lock conversion request from a process. The operation of shadow resource objects shall now be described in greater detail with reference to FIGS. 4, and FIGS. 6*a*–6*d*.

DOWN-CONVERT OPERATIONS

Figure 6A:
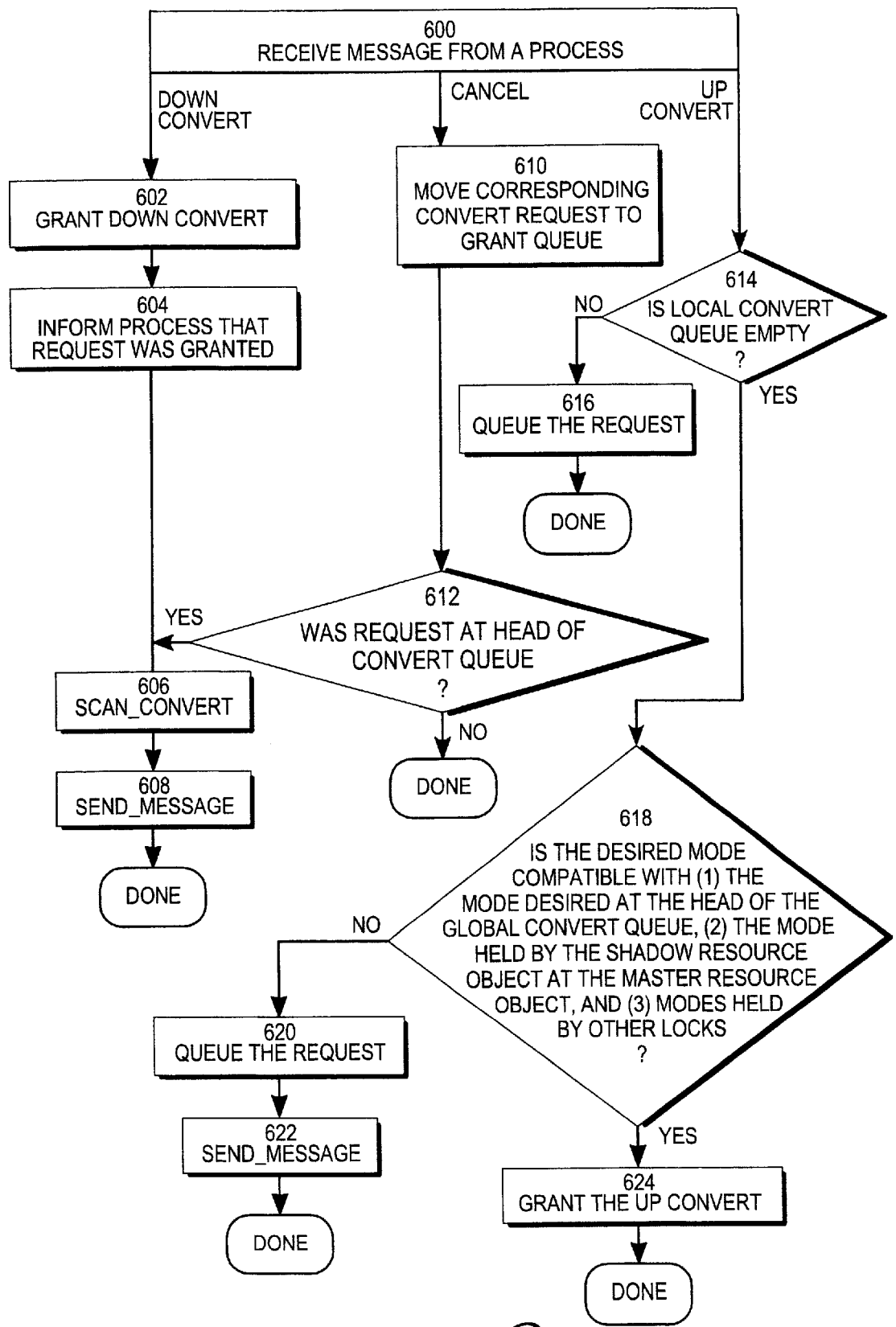
FIG. 6a is a flow chart illustrating steps performed by a shadow resource object upon receiving a lock convert request from a process.

Referring to FIG. 6*a*, at step 600 a shadow resource object receives a lock-related message from a process that resides on the same node as the shadow resource object. The message may be either a lock down convert request, a lock up convert request, or a request to cancel a previous request that was made by the process. When the message is a down convert request, control proceeds to step 602.

In step 602, a shadow resource object grants the down convert request. The down convert request is granted by locating the lock associated with the process on the granted queue of the shadow resource object, and changing the lock mode information on the lock to specify the new mode associated with the lock. For example, if shadow resource object 320 receives a message from process 404 requesting a down convert to NULL mode, shadow resource object 320 would locate lock 430 on granted queue 408. Shadow resource object 320 would then update the mode field in lock 430 to indicate that lock 430 is now a NULL mode lock.

Once the down convert request has been granted, control passes to step 604. At step 604, a shadow resource object informs the process that requested the down convert that the down convert request has been granted. The shadow resource object then performs a SCAN_CONVERT operation and a SEND_MESSAGE operation at steps 606 and 608, respectively. The steps involved in these operations shall be described in detail below with reference to FIGS. 6*b* and 6*c*.

REQUEST CANCEL OPERATIONS

After a process has requested a particular lock convert operation, the new process may determine that it no longer desires the convert operation that it has requested to be performed. To cancel a previously-requested convert request, the process sends a cancel message to the shadow resource object that resides on the same node as the process. At step 600, the shadow resource object receives the cancel message and control proceeds to step 610.

At step 610, the shadow resource object locates, on the convert queue, the convert request associated with the process and moves the convert request back to the granted queue. When this occurs, the convert request reverts to being a granted lock that has the same lock mode as the process held before the process issued the convert request.

At step 612, it is determined whether the convert request that was just canceled had been located at the head of the convert queue. If the canceled convert request was not at the head of the convert queue, then no further processing is required. If the canceled convert request was at the head of the convert queue, then control proceeds to 606 and 608 where SCAN_CONVERT and SEND_MESSAGE operations are performed, respectively.

UP CONVERT OPERATIONS

If the message received from a process at step 600 is a request to convert a lock to a more restrictive lock mode, control passes to step 614. At step 614, a shadow resource object determines whether its local convert queue is empty. If the local convert queue is empty, control passes to step 618. If the local convert queue is not empty, control passes to step 616.

At step 616, the up-convert request is queued. A shadow resource object can queue a request by converting the lock on the granted queue that is owned by the process to a convert request that is places on the convert queue. As the lock currently owned by the process is moved to the convert queue, a value is added to the lock (now a convert request) that indicates the mode to which the lock is to be converted.

As mentioned above, control proceeds to step 618 when the local convert queue is empty. At step 618, the shadow resource object determines whether the lock mode that is indicated in the lock request is compatible with (1) the mode that is desired by the convert request that is at the head of the global request queue (2) the lock mode held by the shadow resource object at the master resource object and (3) lock modes held by other local locks. For shadow resource object 320, the mode that is desired by the global head request is stored in global convert mode data 452. The lock mode held by the shadow resource object 320 is stored in mode held data 450. If the desired mode is compatible, then control passes to step 624, where the up-convert request is granted. If the desired mode is not compatible, then the convert request is placed on the queue at step 620 and a SEND_MESSAGE operation is performed at step 622.

SCAN_CONVERT OPERATIONS

In the descriptions above of how a shadow resource processes messages that it receives from local processes, various circumstances were described in which the shadow resource object performs a SCAN_CONVERT operation. The steps performed by a shadow resource object during a SCAN_CONVERT operation shall now be described with reference to FIG. 6b.

Figure 6B:
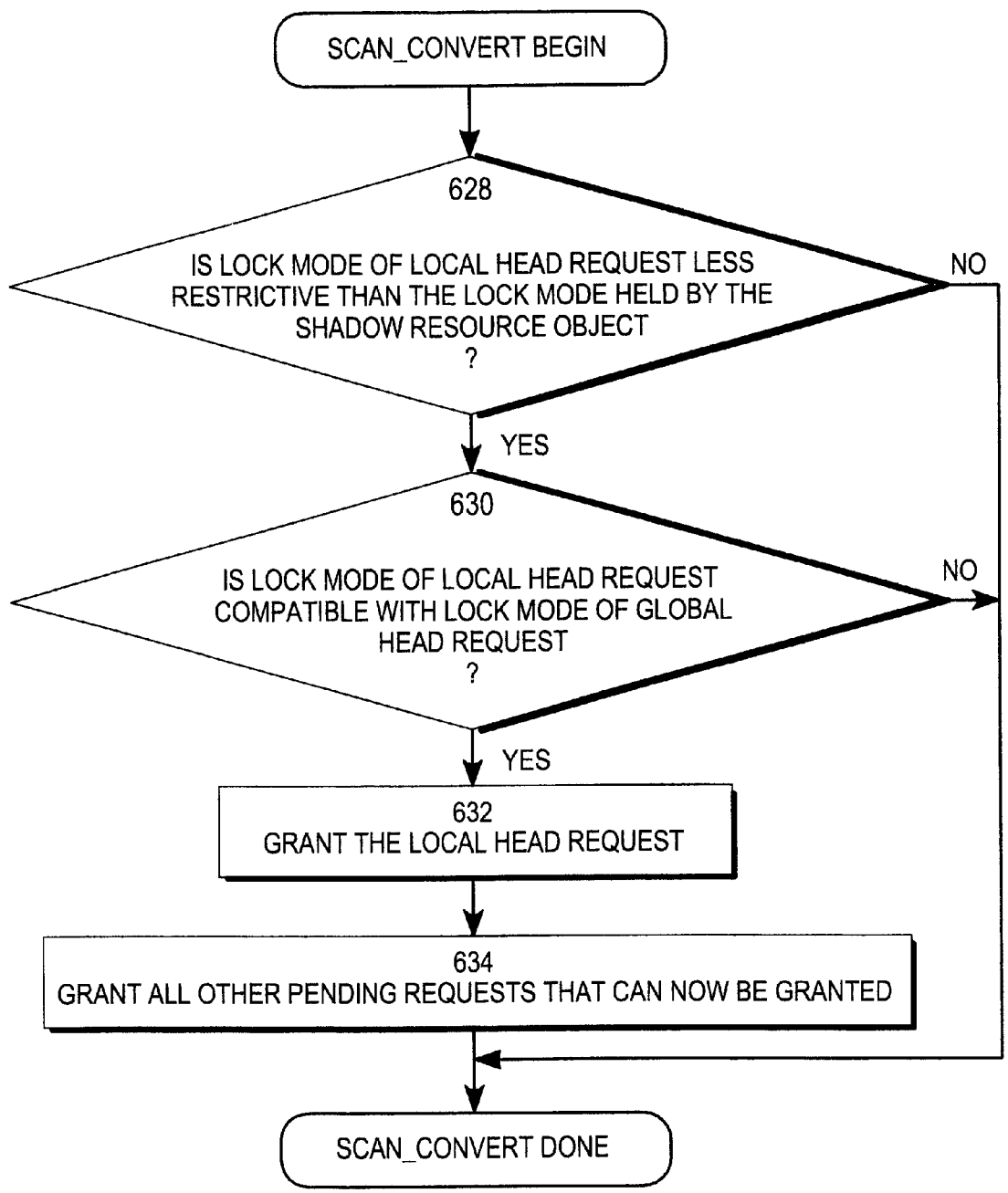

Referring to FIG. 6b, at step 628, the shadow resource object determines whether the lock mode specified in the convert request that is at the head of the local convert queue (the "local head request") is less restrictive than the lock mode held by the shadow resource object. As mentioned above, the lock mode held by the shadow resource object is stored as mode held data on the same node as the shadow resource object. If the lock mode specified by the local head request is less restrictive than the lock mode held by the shadow resource object, control passes to step 630. Otherwise, the SCAN_CONVERT operation is done.

At step 630, the shadow resource object determines whether the lock mode of the local head request is compatible with the lock mode specified by the global head request. The lock mode requested by the global head request is stored in the global convert mode data stored in the same node as the shadow resource object. If the lock mode of the local head request is compatible with the lock mode of the global head request, then control passes to the step 632. Otherwise, the SCAN_CONVERT operation is done.

At step 632, the shadow resource object grants the local head request. The shadow resource object grants the local request by removing the request from the head of the local convert queue, placing the request as a granted lock on the granted queue and informing the process associated with the local head request that the process has been granted the lock mode that the process requested. At step 634, the shadow resource object grants all other pending lock requests that can now be granted.

SEND_MESSAGE OPERATIONS

Preferably, each shadow resource object communicates as little as possible with the master resource object, thus minimizing the amount the inter-node communication. However, under the various conditions discussed above, shadow resource objects perform SEND_MESSAGE operations in which an inter-node message may be sent from the shadow resource object to the master resource object. When such a message is sent from a shadow resource object to the master resource object, the message always contains an indication of the lock mode that the shadow resource holds on the master resource object, and the mode requested by the local head request.

Figure 6C:
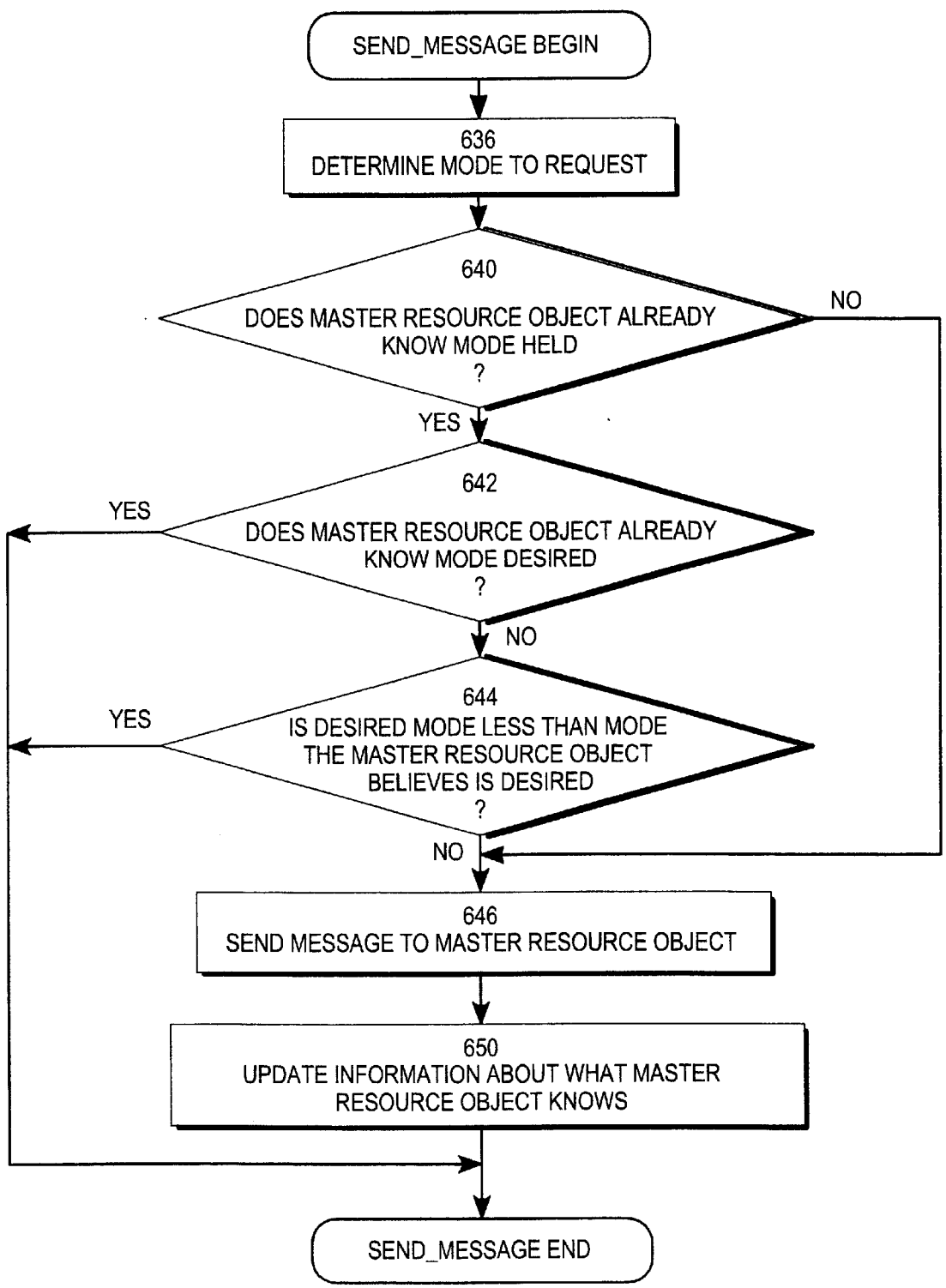

When a shadow resource object specifies the mode that holds to the master resource object, the shadow resource object is generally allowed to specify any lock mode between the level it currently holds at the master resource object and the lowest level compatible with modes held by local locks. According to one approach, if it is possible for a shadow resource object to select a mode that (1) is compatible with modes held by local locks and (2) is compatible with the mode requested by the global head request, then the shadow resource object is required to select a mode that is compatible with modes held by local locks and is compatible with the mode requested by the global head request. Referring to FIG. 6c, at step 636 a shadow resource object determines the mode that the shadow resource will request from the master resource object based on the guidelines described above.

At step 640, the shadow resource object determines whether the master resource object already knows the mode currently held by the shadow resource object. This determination is made by inspecting the master knowledge data stored on the same node as the shadow resource object. As mentioned above, the master knowledge resource data indicates what the master resource object currently "knows" about the shadow resource object. According to one embodiment, the master knowledge resource data indicates the information most recently sent by the shadow resource object to the master resource object.

If the master resource object does not already know the mode held by the shadow resource object, control passes to the step 646. For example, if at step 636 shadow resource object 320 determines to hold a shared mode, and master knowledge data 454 indicates that master resource object 306 thinks that shadow resource object 320 hold an exclusive mode, then control passes to step 646. If the master knowledge data 454 indicates that the master resource object 306 already knows the mode held by the shadow resource object 320, then control passes to step 642.

At step 642, the shadow resource object determines whether the master resource object already knows the mode desired by the shadow resource object. The shadow resource object makes this determination by inspecting the master knowledge data stored on the same node as the shadow resource object. For example, the master knowledge data 454 may indicate that the last convert request sent by shadow resource object 320 to master resource object 306 requested a shared mode lock. If the shadow resource object 320 currently desires an exclusive mode lock, then the shadow resource object 320 determines that the master resource object 306 does not currently know the mode desired by shadow resource object 320.

If the master resource object already knows both the currently held mode and the currently desired mode, then there is no need to send a message to the master resource object and the SEND_MESSAGE operation is done. Otherwise, control passes to step 644.

At step 644, it is determined whether the mode desired by the shadow resource object is less restrictive than the mode that the master resource object currently believes is desired by the shadow resource object. If the desired mode is greater than the mode that the master resource object believes is desired, control passes to step 646.

In the illustrated embodiment, the SEND_MESSAGE operation is ended without the shadow resource object sending a message to the master resource object if the desired mode is less than the mode that the master resource object believes is desired. However, an alternative approach is to allow the shadow resource object to send a message to the master resource object under these conditions. In addition, sending a message may be optional if a shadow resource object holds a lock mode that conflicts with the lock mode requested by the global head request and the shadow resource object is unable to downgrade to be compatible. Under these circumstances, a message will be sent at a later time, so sending a message may only serve to reserve a place in the global convert queue for a subsequent down-convert request.

At step 646, the shadow resource object sends the message to the master resource object. The message indicates the mode currently held by the shadow resource object and the mode desired by the shadow resource object. At step 650, the shadow resource object updates the information about what the master resource object knows about the shadow resource object. For example, if the message sent in step 646 indicates that shadow resource object 320 holds an exclusive mode lock and desires a shared mode lock, then in step 650 shadow resource object 320 would update master knowledge data 454 to indicate that master resource object 306 knows that shadow resource object 320 holds an exclusive mode lock and desires a shared mode lock.

It should be noted that, due to various race conditions, the master knowledge data managed by a given shadow resource object may be deviate from what the master resource object actually knows. To handle these race conditions, the master resource object maintains a sequence number for each shadow resource object. Whenever the master resource object changes what it knows about the shadow resource object, the sequence number is incremented. Whenever the master resource object sends a message to a shadow resource object, the master resource object transmits the sequence number with the message.

When a shadow resource object receives a message from the master resource object, the shadow resource object updates its master knowledge data to reflect what the master resource object knew about the shadow resource object at the time indicated by the sequence number. When the shadow resource object sends a message to the master resource object, the shadow resource object also sends a copy of the most recent sequence number that the shadow resource object has received from the master resource object. If the master resource object receives a message with a stale sequence number, the master resource object discards the message. When the shadow resource object receives a message from the master resource object that has a new sequence number, the shadow resource object may need to retransmit an update-state request with the new sequence number.

CHANGE STATE MESSAGE PROCESSING

Figure 6D:
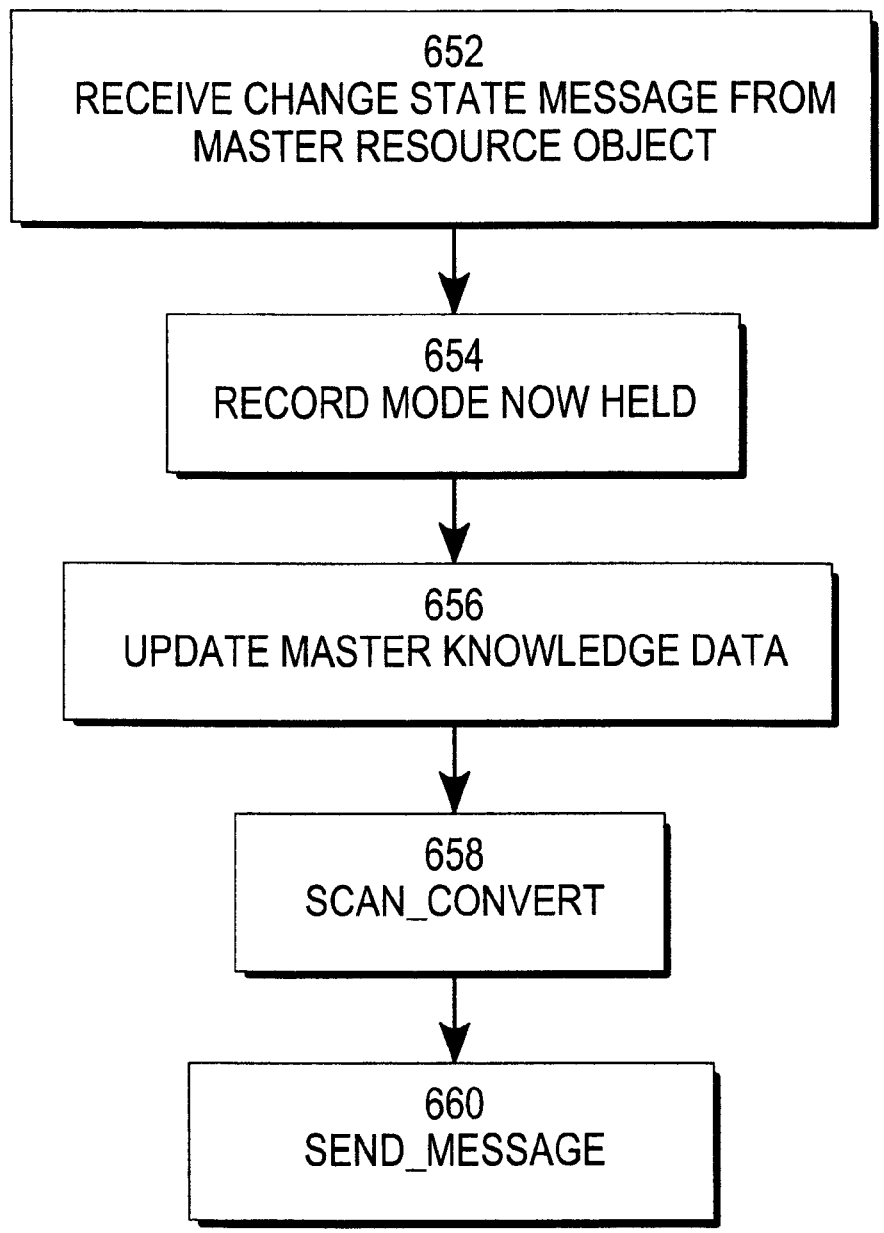

When a master resource object grants a convert request sent by a shadow resource object, the master resource object sends a change state message to the shadow resource object to inform the shadow resource object that the requested lock mode has been granted (step 520 of FIG. 5). FIG. 6d is a flow chart illustrating the steps performed by a shadow resource object upon receiving such a change state message from the master resource object.

At step 652, the shadow resource object receives the change state message from the master resource object. At step 654, the shadow resource object records the mode that is now held by the shadow resource object. Specifically, this information is recorded in the mode held data that resides on the same node as the shadow resource object. At step 656, a shadow resource object updates the information that indicates what the master resource object knows about the shadow resource object. At step 658, a SCAN_CONVERT operation is performed, and at step 660, a SEND_MESSAGE operation is performed.

BLOCKING MESSAGE PROCESSING

Figure 7:
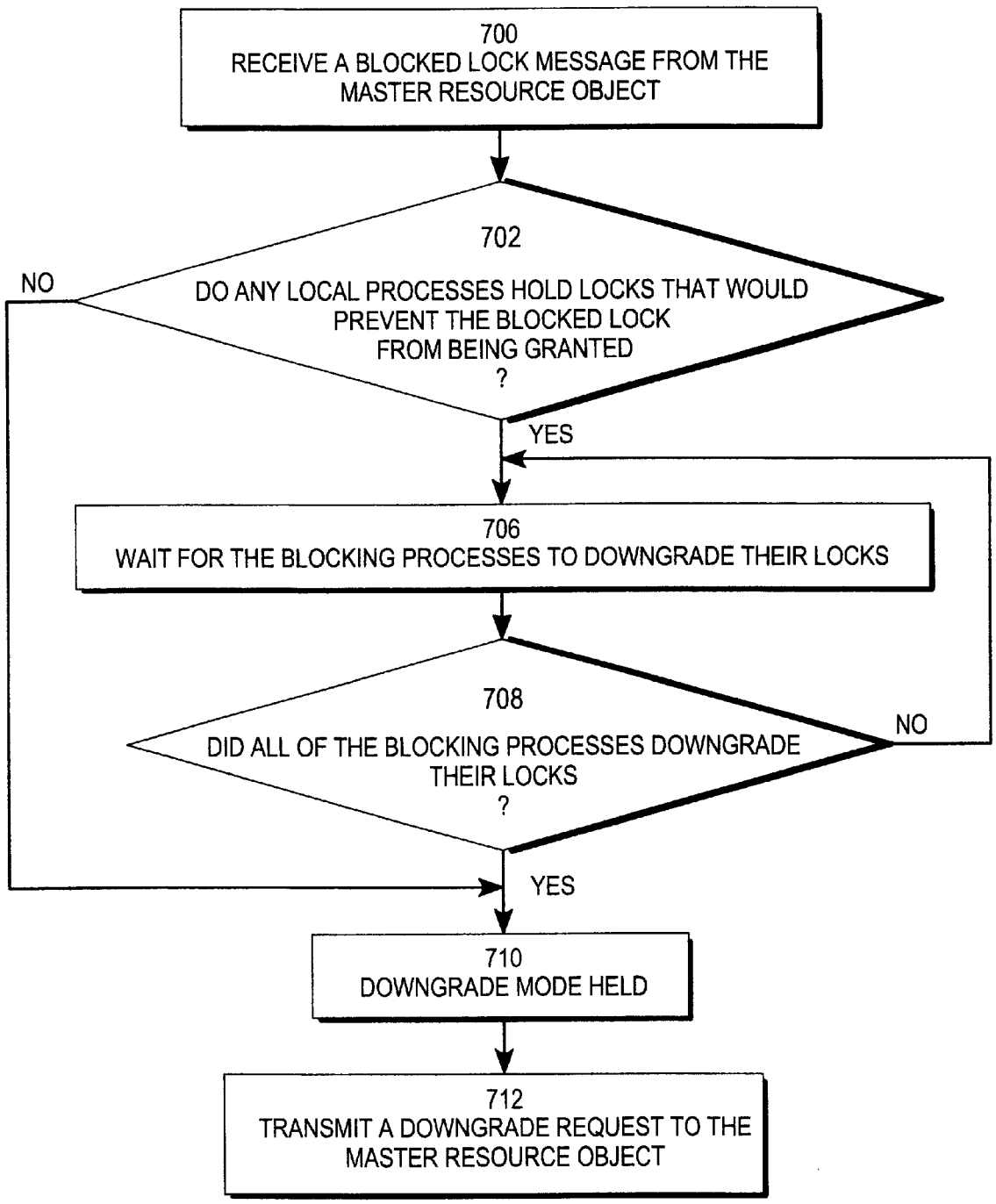
FIG. 7 is a flow chart illustrating steps performed by a shadow resource object upon being informed by a master resource object that a lock held by the shadow resource object is blocking a lock requested by another shadow resource object.

FIG. 7 is a flow chart illustrating the steps performed by a shadow resource object upon receipt of a message from the master resource object that informs the shadow resource object that the global head request is blocked by the lock held at the master resource object by the shadow resource object. For example, in FIG. 4, shadow resource objects 322 and 324 own NULL locks on TABLE_1, and shadow resource object 320 owns an exclusive lock 420 on TABLE_1. Assume that shadow resource object 322 desires to obtain a shared mode lock on TABLE_1. As explained above with reference to FIG. 5, the master resource object 306 will transmit a message to shadow resource object 320 when master resource object 306 determines that the lock 420 held by shadow resource object 320 is blocking the master resource object 306 from granting the lock requested by shadow resource object 322.

At step 700, shadow resource object 320 receives the message from master resource object 306 that informs shadow resource object 320 that another shadow resource object has requested a shared mode lock on TABLE_1. Shadow resource object updates global convert mode data 452 to indicate that the mode requested by the global head request is now a shared mode lock.

At step 702, shadow resource object 320 determines whether any local processes hold locks that would prevent the global head request from being granted. If any local processes hold locks that would prevent the blocked lock from being granted, then control passes to step 704. Otherwise, control passes to step 710.

In the illustrated example, the most restrictive lock attached to granted queue 408 is the shared mode lock 430 held by process 404. The shared mode lock 430 held by process 404 would not prevent the grant of a shared mode lock to shadow resource object 322, so control passes to step 710. At step 710, shadow resource object 320 downgrades the mode it holds to shared mode and updates mode held data 450 and master knowledge data 454, as described above. At step 712, shadow resource object 320 transmits a downgrade request to the master resource object 306 to change lock 420 to a shared mode lock.

After master resource object 306 has downgraded lock 420 to a shared mode lock, master resource object 306 is able to upgrade lock 422 to a shared mode lock. If any processes on node 302 had held locks that were incompatible with the global head request, shadow resource object 320 waits until the blocking processes downgrade their locks (steps 706 and 708) before downgrading its own lock (step 710). According to one embodiment, the shadow resource object 320 may send messages to processes to inform the processes that the locks that they hold are blocking a requested lock.

INTER-NODE COMMUNICATION

In the embodiment described above, the only inter-node communication occurs between the master resource object and the various shadow resource objects. The master resource object sends information to a shadow resource object only when (1) the master resource object is granting a new lock mode to the shadow resource object or (2) the master resource object is asking the shadow resource object to downgrade the lock held by the shadow resource object because the lock held by the shadow resource object is blocking a lock requested by another shadow resource object.

Each shadow resource object sends information to the master resource object only when (1) the shadow resource object is downgrading the lock that it holds, or (2) the shadow resource object is requesting a lock upgrade. All other communication is performed intra-node between the various shadow resource objects and locally-executing processes. Because much of the inter-node communication required by the prior art is performed intra-node in the present distributed resource object lock management system, the amount of network traffic required for lock management is significantly reduced. In addition, lock management becomes more efficient due to the increased speed of intra-node communication relative to inter-node communication.

LOCK DOWNGRADE STRATEGY

In the description given above, shadow resource objects do not automatically downgrade the locks they hold when the local processes downgrade their locks. For example, a shadow resource object that holds an exclusive mode lock on a resource will continue to hold the exclusive mode lock when the process, local to the shadow resource object, that holds an exclusive mode lock downgrades its lock to a shared mode lock. The shadow resource object only downgrades its lock when informed by the master resource object that the lock that the shadow resource object holds is blocking a lock requested by another shadow resource object.

The benefit of not performing automatic lock downgrades is that automatic downgrades may increase the number of upgrade requests that have to be sent by a shadow resource object. For example, consider a situation in which processes on only one node are using a particular resource. Initially, the shadow resource object on that node would acquire from the master resource object a lock with the most restrictive lock mode required by any of the local processes. If automatic downgrading is not performed, then the shadow lock resource would retain the restrictive lock even when the process releases its lock. When a subsequent process on the node subsequently requests a restrictive lock, the shadow resource object may grant the restrictive lock without further communication with the master resource object.

In an alternate embodiment of the invention, shadow resource objects are configured to automatically request lock downgrades when their locally granted locks no longer require the rights granted by the locks they currently hold. A strategy of automatically downgrading locks will reduce the number of blocks that occur between shadow lock resources, and therefore the number of messages that must be sent to the shadow resource objects to inform them that they are blocking a requested lock.

In yet an alternate embodiment, downgrade strategy may vary based on conditions detected in the system. For example, if most of the processes accessing a particular resource are located on a single node, then the shadow resource object at that node may not automatically downgrade, while the shadow resource objects on other nodes do automatically downgrade. The present invention is not limited to any particular downgrade strategy.

In yet an alternate embodiment, downgrade strategy may vary based on resources used in the system. For example, if ninety percent of the resource or lock objects configured in the distributed lock manager are being used, downgrade is immediate. Otherwise, automatic downgrade is deferred until the resource usage threshold is reached, effectively creating a non-referenced shadow resource cache.

SHADOW RESOURCE OBJECT CREATION

In the description given above, system 300 is described in a state in which all of the nodes that have processes that access TABLE_1 have shadow resource objects that maintain locks for TABLE_1. However, a shadow resource object for TABLE_1 may not exist on a node the first time a process on the node attempts to acquire a lock on TABLE_1. According to one embodiment, a process initially attempts to acquire a lock for TABLE_1 from a local shadow resource object. If a local shadow resource object does not exist, then one is created. The new shadow resource object then attempts to acquire a lock from the master resource object for TABLE_1. If a master resource object does not exist, then one is created. These are only some examples of resource object creation strategies that may be used with the present invention. The present invention is not limited to any particular shadow resource object creation strategy.

DEADLOCK DETECTION

According to currently-used deadlock detection techniques, deadlocks are detected based on bipartite directed graphs that include resource nodes and transaction nodes. The edges of the graph indicate which transactions are waiting to use which resources, and which transactions hold locks on which resources. In conventional lock management systems, all of the information required to create these graphs is stored at the master resource object.

In contrast, the information required to create such a graph is distributed over many nodes in distributed lock management system 300. Specifically, the master resource object for a resource does not reflect which specific processes hold locks on the resource. Therefore, such a graph may be constructed by retrieving information from each shadow resource object about the locks that have been granted by each of the shadow resource objects for each resource.

FAULT TOLERANCE

When the node containing a master resource object for a resource fails, a new master resource object and resource object must be constructed to control use of the resource. The new master resource object may be a newly created resource object, or an existing resource object that assumes the responsibility of managing a newly constructed resource object for the resource. Initially, a the new master resource object does not put any locks on the queues of the new resource object. Each of the shadow resource objects that has a lock granted or requested on the master resource sends to the new master resource object messages indicating (1) the lock that they hold on the resource, and (2) any locks they may have requested but not yet been granted on the resource. The new master resource object reconstructs the resource object by adding the locks indicated by the shadow resource objects to the appropriate queues.

Further, in the distributed lock management system described herein, node failure recovery is simplified in that transient states are avoided, and therefore do not have to be resolved when rebuilding a resource object that was lost in a crash. Specifically, many existing lock management schemes perform lock cancel and down convert operations by having processes send a down convert or cancel messages to the resource master. The resource master performs the requested operation and sends an acknowledge signal to the process. After requesting the down convert or cancellation of a lock and before receiving an acknowledge signal from the resource master, the lock is in a transient state (DOWN_CONVERTING or CANCELING). If the resource master crashes while locks are in these states, the states will have to be resolved during the crash recovery process. In contrast, processes requesting lock operations in the distributed lock management system described herein are located on the same nodes as the resource objects to which they make their lock operation requests. Therefore, down convert and cancel operations are performed immediately in a non-blocking manner. Consequently, the locks involved in such operations do enter transient states that will have to be resolved in the case of a crash.

SHADOW LOCKS

According to an alternative embodiment of the invention, each node that has a process that accesses a resource maintains a shadow lock for all processes that share the same shared lock mode on a given resource. A shadow lock is similar to a normal lock in that each shadow lock is associated with a particular lock mode. However, unlike typical locks, shadow locks may be owned by more than one process. The process of using shadow locks shall be described with reference to FIG. 8.

Figure 8:
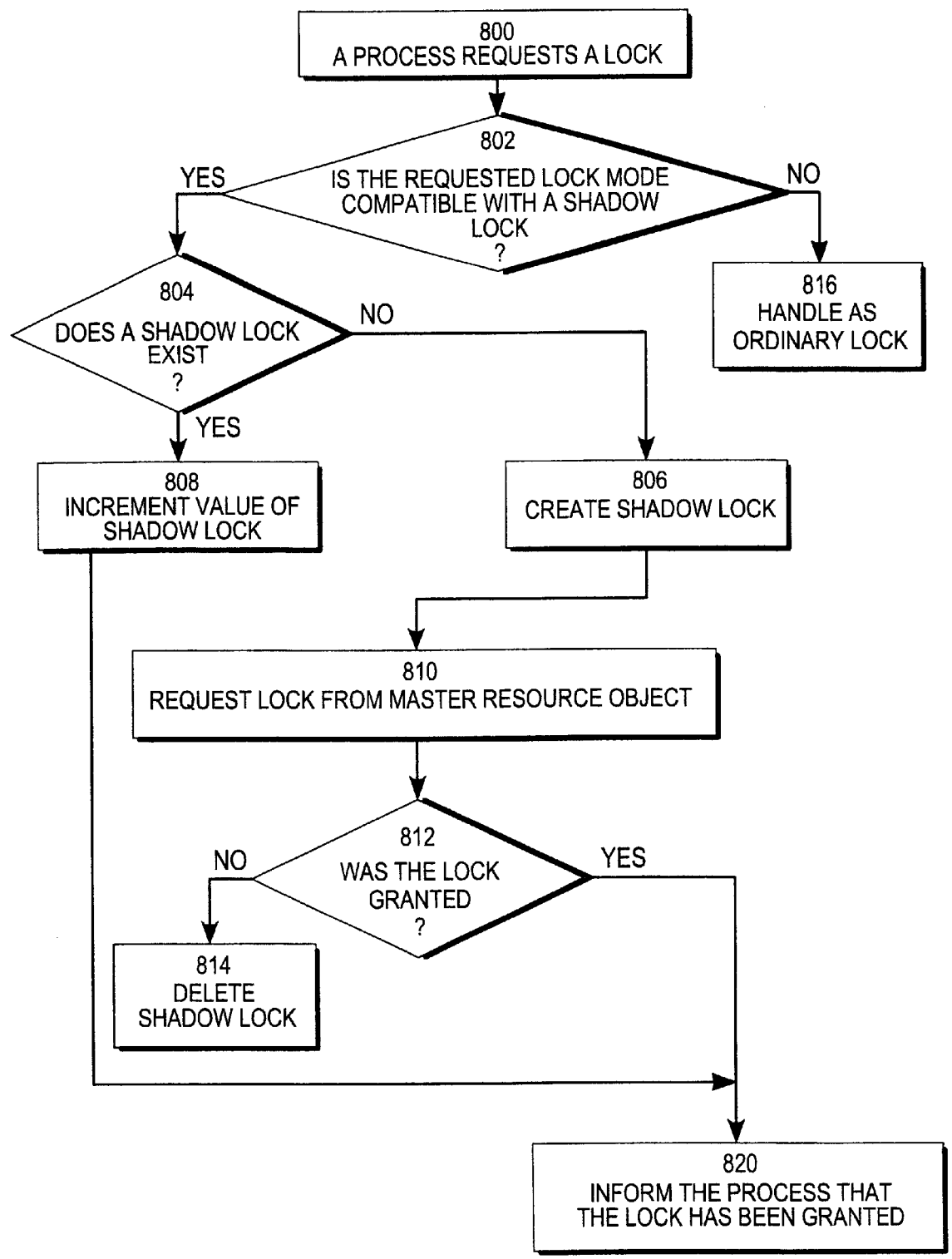
FIG. 8 is a flow chart illustrating steps performed when a process requests a lock in a system that uses shadow locks according to an embodiment of the invention.

Referring to FIG. 8, it is a flow chart of the steps performed when a process requests a lock in a shadow lock embodiment of the invention. At step 800, the process requests a lock. At step 802, it is determined whether the lock mode of the requested lock is compatible with a shadow lock. A lock mode is compatible with a shadow lock if the lock can be held by more than one process at the same time. Thus, NULL mode, concurrent read, concurrent write and protected read modes are all compatible with shadow locks. Exclusive mode and protective write mode are not compatible with shadow locks.

If the requested lock mode is compatible with a shadow lock, then control passes to step 804. Otherwise, control passes to step 816 where the lock is handled like an ordinary lock. That is, the process interacts with the master resource object to obtain the lock.

If the requested lock mode is compatible with a shadow lock, then at step 804 it is determined whether a shadow lock for the requested mode already exists at the node on which the requesting process is located. If the appropriate shadow lock already exists, then control passes to step 808, otherwise control passes to step 806.

At step 808, the value associated with the shadow lock is incremented to indicate that one more process is using the shadow lock. Control then proceeds to step 820 where the process is informed that the requested lock has been granted.

If the appropriate shadow lock does not exist, then a shadow lock for the requested lock mode is created at step 806. During this step, a new shadow lock may be created or an existing shadow lock may be cloned and upgraded. For example, assume that processes A holds a first type of shadow lock on a particular resource, but wants to hold a second type of shadow lock on the resource. A new shadow lock may be created by cloning the shadow lock currently held by process A and upgrading (or downgrading) the shadow lock clone.

The shadow lock is stored on the same node as the process making the lock request. At step 810, a message is sent to the master resource object to request that the shadow lock be granted. If the locks that have been granted for the resource in question allow the shadow lock to be granted, then the master resource object grants the shadow lock by placing a lock that corresponds to the shadow lock on a granted queue. The master resource object then transmits a message back to the shadow lock to indicate that the lock was granted. At step 820 a message is sent to the process to indicate that the shadow lock was granted.

If the master resource object could not grant the lock, then the master resource object transmits a message to the node to indicate that the shadow lock was not granted. The message may also indicate why the lock was not granted. For example, the message may indicate that the lock was not granted due to a deadlock or timeout condition. At step 814, the shadow lock is deleted. Because the shadow lock is deleted, a subsequent attempt by the process to obtain the lock will cause a new shadow lock to be created.

In an alternate embodiment, the master resource object may place lock requests that cannot be immediately granted on its convert queue. When the condition that prevents the master resource object from granting the lock has terminated, the master resource object may grant the lock by moving the lock from the convert queue to the granted queue. The master resource object would then send a message to the process that requested the lock to indicate that the lock has been granted.

If the process that was granted a lock had previously possessed a different mode of lock, then the previous lock is removed. If the previous lock was a shadow lock, then the value of the shadow lock is decremented. If the previous lock was not a shadow lock, then the previous lock is deleted by transmitting the appropriate lock release message to the master resource object.

If the count of a shadow lock is decremented to zero, no processes are using the shadow lock. The shadow lock may therefore be deleted at the node, and the lock at the master resource object that corresponds to the shadow lock may also be deleted. As explained above, various downgrading policies may be used. For example, shadow locks that are not used by any processes may always be automatically deleted or may never be automatically deleted.

In addition, the shadow lock downgrade strategy may be configurable by a user. Specifically, a user may specify that each node may hold up to n locks that are not currently being used by any process. If n equals zero, then all locks are automatically downgraded. If n equals infinity, then locks are never automatically downgraded. If n equals 5, the downgrading will occur automatically when a node has five locks that are not required for the locks currently granted to local processes.

A separate shadow lock is used for each type of lock granted on a resource. If a process is the only owner of a particular type of shadow lock, the process can request an upgrade to the shadow lock it owns rather than the creation of a new shadow lock that grants the desired access rights.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for allocating a resource in a system that includes a plurality of processes executing on a plurality of nodes, the method comprising the steps of:
   causing a process to obtain, prior to accessing the resource in a particular way, a first lock that grants permission for the process to access the resource in the particular way, wherein the process requests the first lock from a shadow resource object located on the same node as the process;
   causing the shadow resource object to obtain, prior to granting the first lock to the process, a second lock that grants permission for the shadow resource object to grant locks that grant permission for processes to access the resource in the particular way, wherein the shadow resource object requests the second lock from a master resource object stored on a different node than said shadow resource object;
   causing the process to transmit a first message to the shadow resource object to request the first lock if the process does not currently hold a lock that permits the process to access the resource in the particular way;
   causing the shadow resource object to transmit a second message to the master resource object to request the second lock if the shadow resource object does not currently hold a lock that permits the shadow resource object to grant the first lock to the process;
   in response to said master resource object receiving said second message, causing said master resource object to determine whether any lock currently granted by said master resource object or previously received lock request prevents said master resource object from granting said second lock to said shadow resource object;
   if any locks currently granted by said master resource object prevent said master resource object from granting said second lock to said shadow resource object, then causing said master resource object to perform the steps of:
      determining owners of the locks currently granted by said master resource object that prevent said master resource object from granting said second lock; and
      transmitting to said owners a third message that informs said owners that a lock that has been requested is blocked by a lock owned by said owners;
   one of said owners transmitting a fourth message to said master resource object to downgrade the lock on the resource held by said owner;
   in response to receiving said fourth message, said master resource object performing the steps of:
      downgrading the lock on the resource held by said owner;
      determining whether all of the locks currently granted by said master resource object that prevent said master resource object from granting said second lock have been downgraded;
      if all of the locks currently granted by said master resource object that prevent said master resource object from granting said second lock have been downgraded, then granting lock requests including said request for said second lock; and
      transmitting to said shadow resource object a fifth message to inform said shadow resource object that said request for the second lock has been granted;
   wherein said master resource object includes a convert queue;
   placing a first lock request corresponding to said request for said second lock on said convert queue;
   wherein said steps of determining owners and transmitting to said owners are performed when said first lock request is at a head of said convert queue;
   wherein the step of granting lock requests includes granting other lock requests on said convert queue other than said first lock request;
   wherein the convert queue includes a second lock request and a third lock request;
   wherein said second lock request is closer to said head of said convert queue than the third lock request;
   wherein the step of granting lock requests includes granting said third lock request without granting said second lock request; and
   wherein the step of granting said third lock request is performed while said second lock request remains in said convert queue.

2. The method of claim 1, wherein the third message indicates the lock mode of the lock that has been requested.

3. The method of claim 1, wherein the third message indicates the lock mode of the particular lock request at the head of the convert queue.

4. The method of claim 1, further including transmitting a sixth message to the shadow resource objects that requested said other lock requests, wherein the sixth message indicates the lock mode requested by the particular lock request at the head of the convert queue.

5. The method of claim 4, wherein the step of granting other lock requests includes granting all other lock requests on said convert queue that are compatible with granted locks in response to granting said second lock.

6. The method of claim 4,
   wherein a set of locks have been placed on said convert queue as said other lock requests;
   wherein the step of granting other lock requests includes the steps of:
      attaching each lock of said set of locks to a granted queue; and
      marking each lock of said set of locks to indicate that said sixth message should be transmitted for said each lock.

7. A computer-readable medium carrying one or more sequences of instructions for allocating a resource in a system that includes a plurality of first processes executing on a plurality of nodes, wherein execution of the one or more sequences of instructions by one or more processors causes the one or more processors to perform the steps of:
   causing a process to obtain, prior to accessing the resource in a particular way, a first lock that grants permission for the process to access the resource in the particular way, wherein the process requests the first lock from a shadow resource object located on the same node as the process;
   causing the shadow resource object to obtain, prior to granting the first lock to the process, a second lock that grants permission for the shadow resource object to grant locks that grant permission for processes to access the resource in the particular way, wherein the shadow resource object requests the second lock from a master resource object stored on a different node than said shadow resource object;
   causing the process to transmit a first message to the shadow resource object to request the first lock if the process does not currently hold a lock that permits the process to access the resource in the particular way;

causing the shadow resource object to transmit a second message to the master resource object to request the second lock if the shadow resource object does not currently hold a lock that permits the shadow resource object to grant the first lock to the process;

in response to said master resource object receiving said second message, causing said master resource object to determine whether any lock currently granted by said master resource object or previously received lock request prevents said master resource object from granting said second lock to said shadow resource object;

if any locks currently granted by said master resource object prevent said master resource object from granting said second lock to said shadow resource object, then causing said master resource object to perform the steps of:

determining owners of the locks currently granted by said master resource object that prevent said master resource object from granting said second lock; and transmitting to said owners a third message that informs said owners that a lock that has been requested is blocked by a lock owned by said owners;

one of said owners transmitting a fourth message to said master resource object to downgrade the lock on the resource held by said owner;

in response to receiving said fourth message, said master resource object performing the steps of:

downgrading the lock on the resource held by said owner;

determining whether all of the locks currently granted by said master resource object that prevent said master resource object from granting said second lock have been downgraded;

if all of the locks currently granted by said master resource object that prevent said master resource object from granting said second lock have been downgraded, then granting lock requests including said request for said second lock; and transmitting to said shadow resource object a fifth message to inform said shadow resource object that said request for the second lock has been granted;

wherein said master resource object includes a convert queue;

placing a first lock request corresponding to said request for said second lock on said convert queue;

wherein said steps of determining owners and transmitting to said owners are performed when said first lock request is at a head of said convert queue;

wherein the step of granting lock requests includes granting other lock requests on said convert queue other than said first lock request;

wherein the convert queue includes a second lock request and a third lock request;

wherein said second lock request is closer to said head of said convert queue than the third lock request;

wherein the step of granting lock requests includes granting said third lock request without granting said second lock request; and wherein the step of granting said third lock request is performed while said second lock request remains in said convert queue.

8. The computer-readable medium of claim 7, wherein the third message indicates the lock mode of the lock that has been requested.

9. The computer-readable medium of claim 7, wherein the third message indicates the lock mode of the particular lock request at the head of the convert queue.

10. The computer-readable medium of claim 7, further including one or more instructions for transmitting a sixth message to the shadow resource objects that requested said other lock requests, wherein the sixth message indicates the lock mode requested by the particular lock request at the head of the convert queue.

11. The computer-readable medium of claim 10, wherein the step of granting other lock requests includes granting all other lock requests on said convert queue that are compatible with granted locks in response to granting said second lock.

12. The computer-readable medium of claim 10, wherein a set of locks have been placed on said convert queue as said other lock requests;

wherein the step of granting other lock requests includes the steps of:

attaching each lock of said set of locks to a granted queue; and marking each lock of said set of locks to indicate that said sixth message should be transmitted for said each lock.

13. A computer system, comprising:

a plurality of nodes configured to execute a plurality of processes;

a resource;

said computer system configured to perform the steps of:

causing a process to obtain, prior to accessing the resource in a particular way, a first lock that grants permission for the process to access the resource in the particular way, wherein the process requests the first lock from a shadow resource object located on the same node as the process;

causing the shadow resource object to obtain, prior to granting the first lock to the process, a second lock that grants permission for the shadow resource object to grant locks that grant permission for processes to access the resource in the particular way, wherein the shadow resource object requests the second lock from a master resource object stored on a different node than said shadow resource object;

causing the process to transmit a first message to the shadow resource object to request the first lock if the process does not currently hold a lock that permits the process to access the resource in the particular way;

causing the shadow resource object to transmit a second message to the master resource object to request the second lock if the shadow resource object does not currently hold a lock that permits the shadow resource object to grant the first lock to the process;

in response to said master resource object receiving said second message, causing said master resource object to determine whether any lock currently granted by said master resource object or previously received lock request prevents said master resource object from granting said second lock to said shadow resource object;

if any locks currently granted by said master resource object prevent said master resource object from granting said second lock to said shadow resource object, then causing said master resource object to perform the steps of:

determining owners of the locks currently granted by said master resource object that prevent said master resource object from granting said second lock; and transmitting to said owners a third message that informs said owners that a lock that has been requested is blocked by a lock owned by said owners;

one of said owners transmitting a fourth message to said master resource object to downgrade the lock on the resource held by said owner;

in response to receiving said fourth message, said master resource object performing the steps of:
 downgrading the lock on the resource held by said owner;
 determining whether all of the locks currently granted by said master resource object that prevent said master resource object from granting said second lock have been downgraded;
 if all of the locks currently granted by said master resource object that prevent said master resource object from granting said second lock have been downgraded, then granting lock requests including said request for said second lock; and
 transmitting to said shadow resource object a fifth message to inform said shadow resource object that said request for the second lock has been granted;

wherein said master resource object includes a convert queue;

placing a first lock request corresponding to said request for said second lock on said convert queue;

wherein said steps of determining owners and transmitting to said owners are performed when said first lock request is at a head of said convert queue;

wherein the step of granting lock requests includes granting other lock requests on said convert queue other than said first lock request;

wherein the convert queue includes a second lock request and a third lock request;

wherein said second lock request is closer to said head of said convert queue than the third lock request;

wherein the step of granting lock requests includes granting said third lock request without granting said second lock request; and wherein the step of granting said third lock request is performed while said second lock request remains in said convert queue.

14. The computer system of claim 13, wherein the third message indicates the lock mode of the lock that has been requested.

15. The computer system of claim 13, wherein the third message indicates the lock mode of the particular lock request at the head of the convert queue.

16. The computer system of claim 13, further including one or more instructions for transmitting a sixth message to the shadow resource objects that requested said other lock requests, wherein the sixth message indicates the lock mode requested by the particular lock request at the head of the convert queue.

17. The computer system of claim 16, wherein the step of granting other lock requests includes granting all other lock requests on said convert queue that are compatible with granted locks in response to granting said second lock.

18. The computer system of claim 16,
 wherein a set of locks have been placed on said convert queue as said other lock requests;
 wherein the step of granting other lock requests includes the steps of:
  attaching each lock of said set of locks to a granted queue; and
  marking each lock of said set of locks to indicate that said sixth message should be transmitted for said each lock.

* * * * *